United States Patent
Uemura et al.

(10) Patent No.: US 10,774,837 B2
(45) Date of Patent: Sep. 15, 2020

(54) HEAT PUMP APPARATUS, AIR CONDITIONER, AND WATER HEATER

(71) Applicant: Mitsubishi Electric Corporation, Tokyo (JP)

(72) Inventors: Keisuke Uemura, Tokyo (JP); Koichi Arisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 21 days.

(21) Appl. No.: 16/323,063

(22) PCT Filed: Aug. 22, 2016

(86) PCT No.: PCT/JP2016/074418
§ 371 (c)(1),
(2) Date: Feb. 4, 2019

(87) PCT Pub. No.: WO2018/037465
PCT Pub. Date: Mar. 1, 2018

(65) Prior Publication Data
US 2019/0178254 A1 Jun. 13, 2019

(51) Int. Cl.
*F25B 29/00* (2006.01)
*F04D 27/00* (2006.01)
(Continued)

(52) U.S. Cl.
CPC ............ *F04D 27/00* (2013.01); *F04D 27/004* (2013.01); *F25B 1/00* (2013.01); *F25B 1/04* (2013.01);
(Continued)

(58) Field of Classification Search
CPC .......... F04D 27/00; F04D 27/004; F25B 1/00; F25B 1/04; F25B 13/00; F25B 30/02; F25B 213/021; F24F 1/06
(Continued)

(56) References Cited

U.S. PATENT DOCUMENTS

| | | | | |
|---|---|---|---|---|
| 6,357,246 B1* | 3/2002 | Jin | ........................... | F25B 13/00 |
| | | | | 165/48.2 |
| 2013/0081419 A1* | 4/2013 | Katoh | .................... | B60H 1/004 |
| | | | | 62/278 |

(Continued)

FOREIGN PATENT DOCUMENTS

| | | |
|---|---|---|
| JP | H04-6844 B2 | 2/1992 |
| JP | H04-288438 A | 10/1992 |

(Continued)

OTHER PUBLICATIONS

Office Action dated Jan. 7, 2020 for the corresponding JP application No. 2018-535948 (and English translation).
(Continued)

*Primary Examiner* — Davis D Hwu
(74) *Attorney, Agent, or Firm* — Posz Law Group, PLC

(57) ABSTRACT

A heat pump apparatus includes an outdoor heat exchanger, a fan configured to introduce outdoor air into the outdoor heat exchanger, and a control device configured to control a defrosting operation of the outdoor heat exchanger. The fan rotates at a first rotational speed within a first period, after the defrosting operation is finished and the fan starts rotating. The fan rotates at the first rotational speed within a second period, after a non-defrosting operation is finished and the fan starts rotating. The first period is shorter than the second period.

9 Claims, 7 Drawing Sheets

(51) Int. Cl.
  *F25B 13/00* (2006.01)
  *F25B 30/02* (2006.01)
  *F25B 1/00* (2006.01)
  *F25B 1/04* (2006.01)
  *F24F 1/06* (2011.01)

(52) U.S. Cl.
  CPC .............. *F25B 13/00* (2013.01); *F25B 30/02* (2013.01); *F24F 1/06* (2013.01); *F25B 2313/021* (2013.01)

(58) Field of Classification Search
  USPC .......................................................... 165/240
  See application file for complete search history.

(56) References Cited

U.S. PATENT DOCUMENTS

2013/0098092 A1* 4/2013 Wakamoto ............ F25B 47/025
  62/278

2016/0116202 A1* 4/2016 Takenaka .............. F25B 47/022
  62/140

FOREIGN PATENT DOCUMENTS

| JP | H06-241536 A | 8/1994 |
| JP | H06-331202 A | 11/1994 |
| JP | 2003-240391 A | 8/2003 |
| JP | 2004-301390 A | 10/2004 |
| JP | 2010-025493 A | 2/2010 |
| JP | 2012-159270 A | 8/2012 |
| JP | 2013-053782 A | 3/2013 |

OTHER PUBLICATIONS

International Search Report of the International Searching Authority dated Nov. 15, 2016 for the corresponding International application No. PCT/JP2016/074418 (and English translation).

Office Action dated Apr. 23, 2020 for the corresponding CN patent application No. 201680088462.0 (and English translation).

* cited by examiner

FIG.6
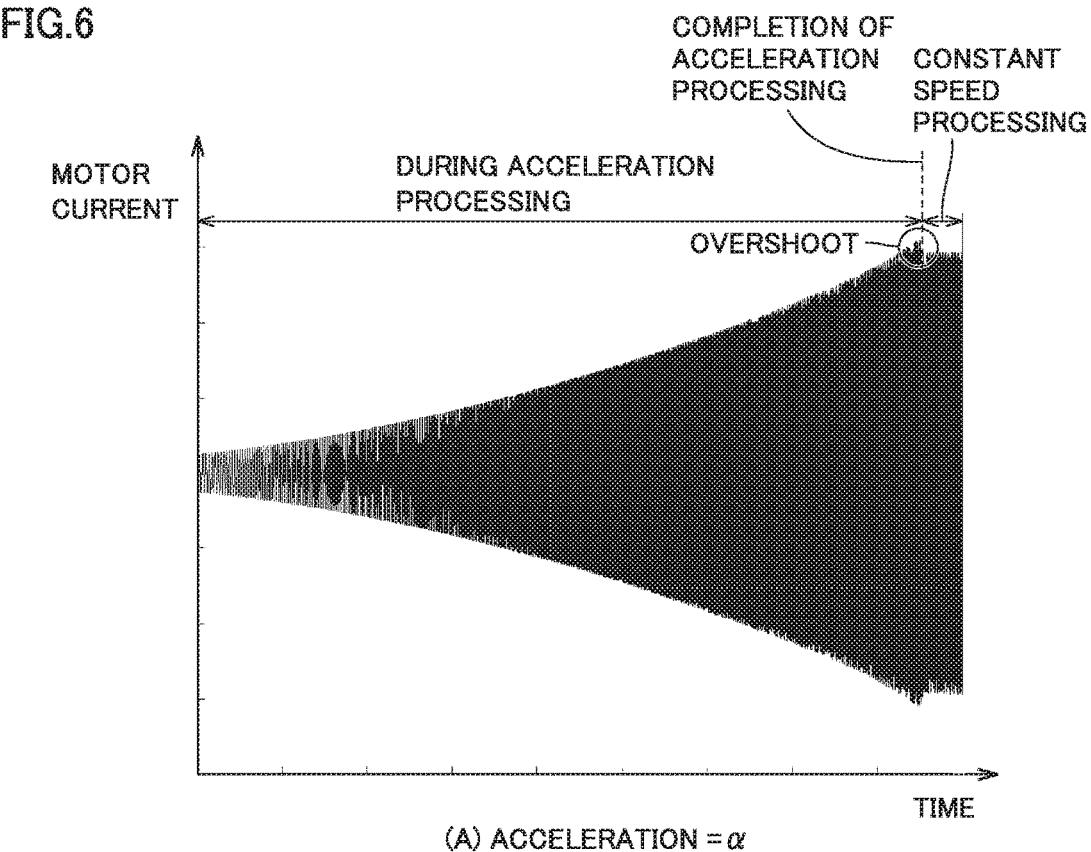
(A) ACCELERATION = $\alpha$
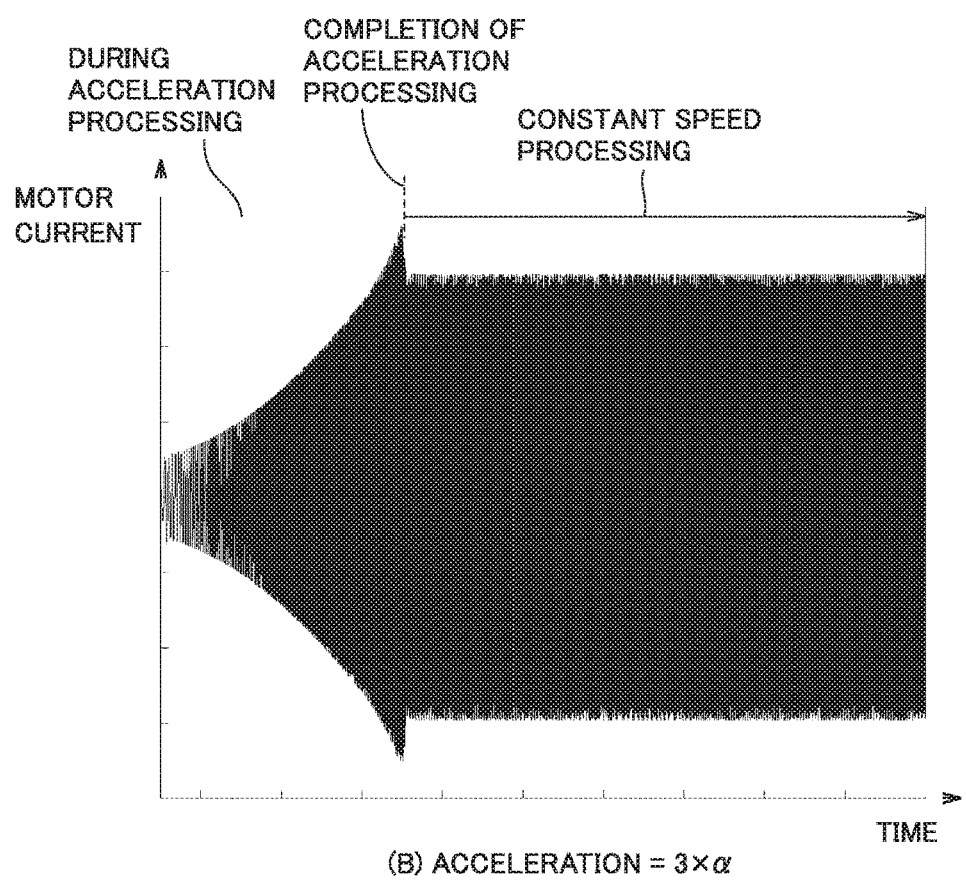
(B) ACCELERATION = $3 \times \alpha$ FIG.9
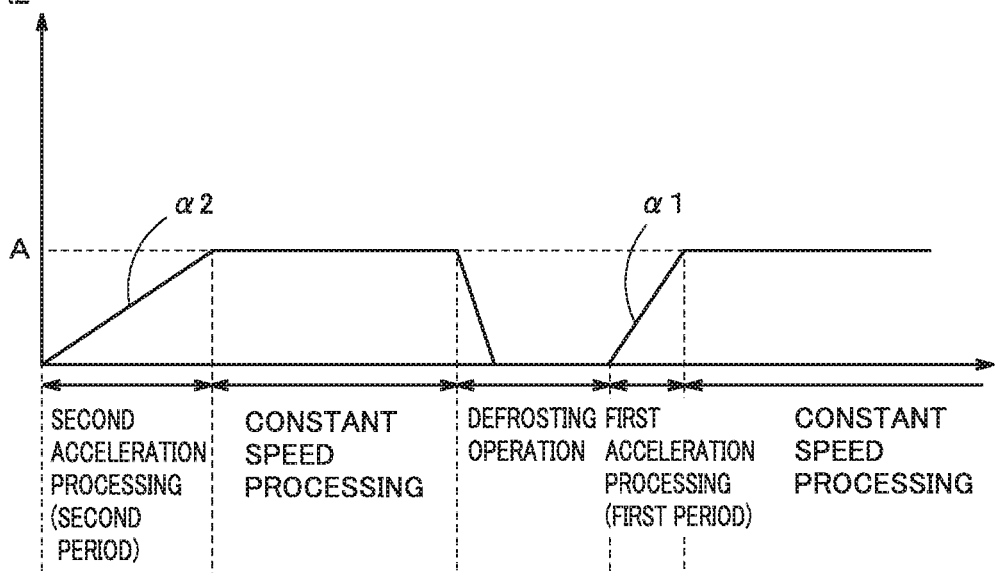
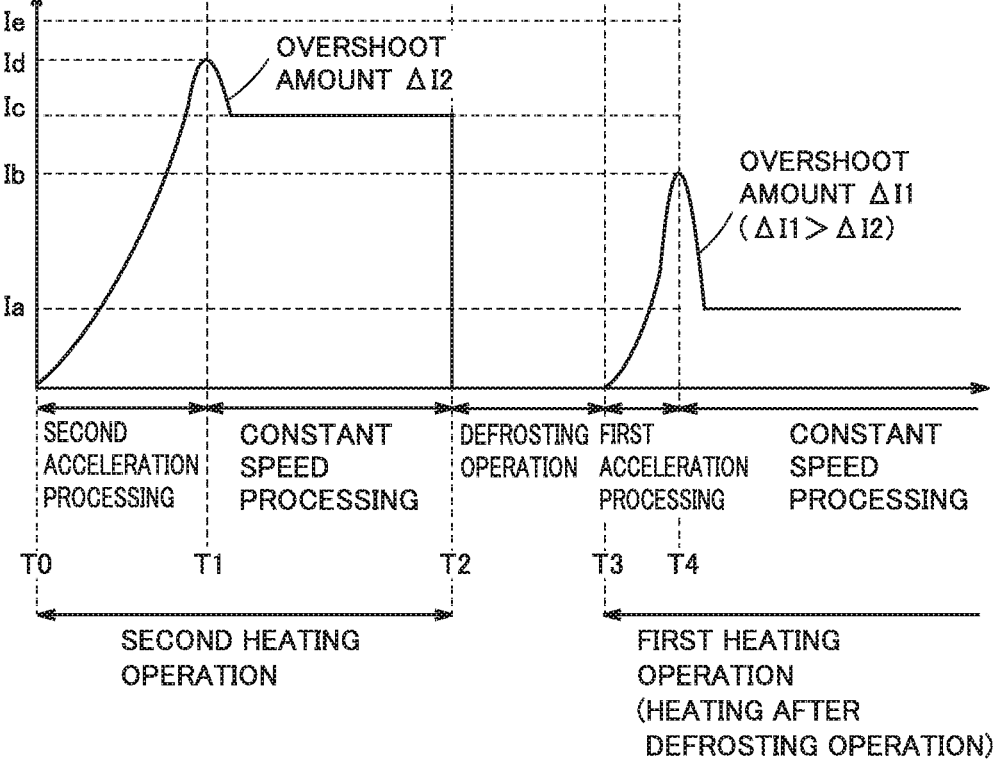

HEAT PUMP APPARATUS, AIR CONDITIONER, AND WATER HEATER

CROSS REFERENCE TO RELATED APPLICATION

This application is a U.S. national stage application of PCT/JP2016/074418 filed on Aug. 22, 2016, the contents of which are incorporated herein by reference.

TECHNICAL FIELD

The present invention relates to a heat pump apparatus, an air conditioner, and a water heater.

BACKGROUND ART

Conventionally, an air conditioner including an indoor unit and an outdoor unit is known. When the air conditioner performs a heating operation in a state in which outdoor air temperature is low, there arises a frosted state in which frost forms on an heat exchanger of the outdoor unit. Since heat exchange efficiency of the heat exchanger of the outdoor unit is reduced in the frosted state, a defrosting operation for melting the frost on the heat exchanger of the outdoor unit is performed. However, in spite of the fact that the heating operation is performed, room temperature is decreased due to the defrosting operation.

For example, when an air conditioner described in PTL 1 finishes a defrosting operation and performs a heating operation, the air conditioner utilizes an amount of heat stored in a heat exchanger of an outdoor unit. Thus, the air conditioner stops driving of an outdoor fan until the temperature of the heat exchanger of the outdoor unit becomes lower than outdoor air temperature. Then, when the temperature of the heat exchanger of the outdoor unit becomes lower than the outdoor air temperature, the air conditioner accelerates rotation of the outdoor fan at the same acceleration as that used when it starts an operation such as the heating operation.

CITATION LIST

Patent Literature

PTL 1: Japanese Patent Laying-Open No. 2013-53782

SUMMARY OF INVENTION

Technical Problem

However, in the air conditioner described in PTL 1, room temperature decreased due to the defrosting operation is increased using the capability of the ordinary heating operation. Thus, there occurs a problem that it takes a long time to increase the room temperature, which is an object for temperature increase, to a target temperature.

The present invention has been made to solve the aforementioned problem, and is intended to increase an object for temperature increase to a target temperature in a short time after a defrosting operation is finished.

Solution to Problem

A heat pump apparatus in one embodiment of the present invention includes: a refrigerant circuit composed of a compressor, a flow path switching valve, an outdoor heat exchanger, a decompression device, and an indoor heat exchanger connected by pipes; a fan configured to introduce outdoor air into the outdoor heat exchanger; a motor configured to rotate the fan; and a control device configured to control the motor. The control device controls the motor such that, when rotation of the fan is accelerated after a defrosting operation, an acceleration of the rotation of the fan becomes greater than an acceleration when the rotation of the fan is accelerated without performing the defrosting operation beforehand.

An air conditioner in one embodiment of the present invention includes the heat pump apparatus described above.

A water heater in one embodiment of the present invention includes the heat pump apparatus described above.

Advantageous Effects of Invention

According to the present invention, it is possible to increase an object for temperature increase to a target temperature in a short time after a defrosting operation is finished.

BRIEF DESCRIPTION OF DRAWINGS

FIG. 6 is a view for illustrating the relation between the motor current and acceleration.

FIG. 9 is a view for illustrating a timing chart.

DESCRIPTION OF EMBODIMENTS

First Embodiment

Figure 1:
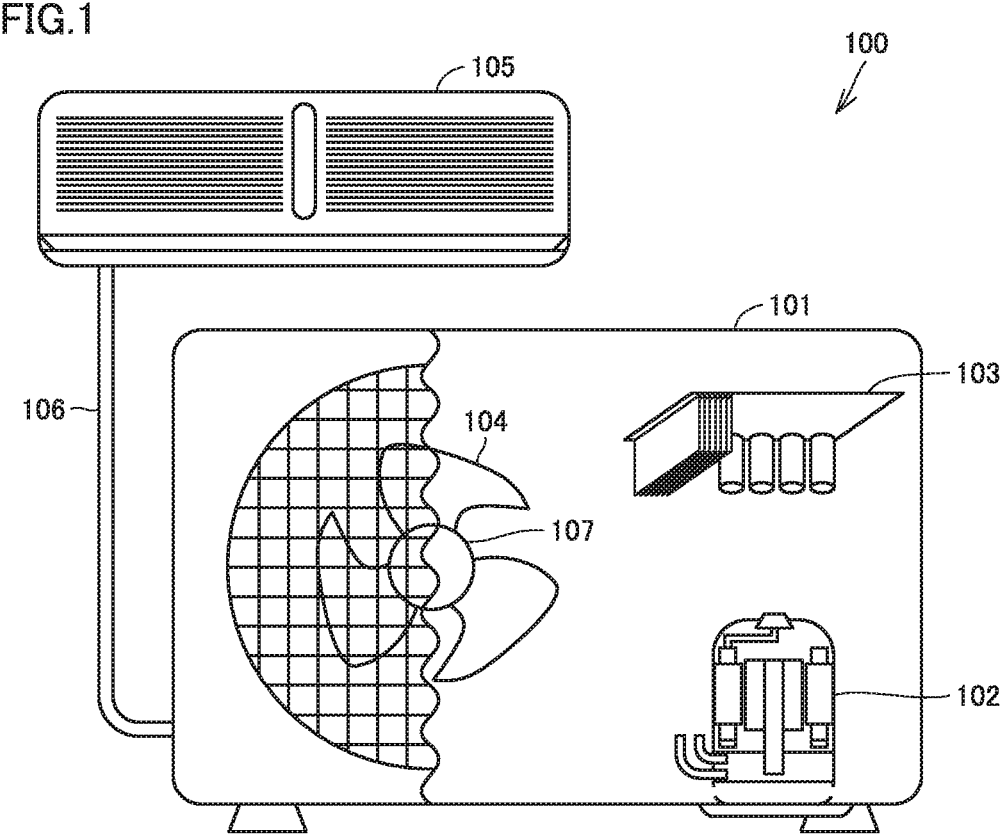
FIG. 1 is a view for illustrating a configuration of an air conditioner.

First, an exemplary configuration of an air conditioner in a first embodiment will be described. FIG. 1 is a view for illustrating a configuration of an air conditioner 100. Air conditioner 100 includes an outdoor unit 101 and an indoor unit 105. Indoor unit 105 and outdoor unit 101 are connected by a pipe 106. Air conditioner 100 includes a compressor 102, a control device 103, an outdoor fan 104, and an outdoor fan motor 107. Outdoor fan motor 107 rotationally drives outdoor fan 104. It should be noted that, although the present embodiment describes a case where the indoor unit and the outdoor unit have a 1:1 relation, they may have a 1:n or n:1 relation (n=an integer more than or equal to 2).

Figure 2:
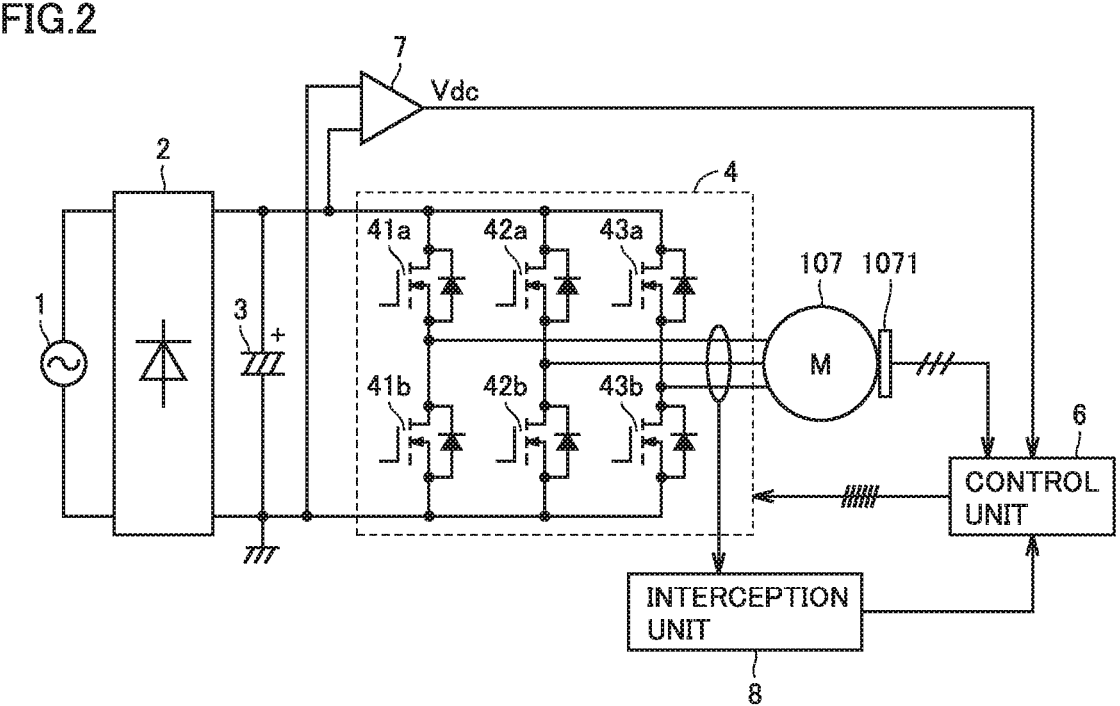
FIG. 2 is a view for illustrating a configuration of a control device.

FIG. 2 is a view for illustrating control device 103 and outdoor fan motor 107. In FIG. 2, control device 103 is connected to outdoor fan motor 107, and includes: an alternating current (AC) power supply 1; a rectifier 2 configured to rectify a current from AC power supply 1; a smoothing means 3 configured to smooth the rectified current and thereby convert it into direct current (DC) power; an inverter 4 configured to supply the DC power to outdoor fan motor 107 as three-phase AC power; a bus voltage detection unit 7 configured to detect a bus voltage Vdc to be input into inverter 4 and output bus voltage Vdc to a control unit 6; control unit 6 configured to generate a drive signal for driving outdoor fan motor 107 based on a value of detected bus voltage Vdc; and an interception unit 8 configured to detect a current flowing into outdoor fan motor 107 and output a stop signal to control unit 6. Hereinafter, a current supplied from inverter 4 to outdoor fan motor 107 will be referred to as a "motor current".

Inverter 4 is composed of pairs of upper and lower switching elements 41a and 41b, 42a and 42b, and 43a and 43b, which correspond to three phases including a U phase, a V phase, and a W phase, respectively. Specifically, upper arm switching element 41a and lower arm switching element 41b correspond to the U phase, upper arm switching element 42a and lower arm switching element 42b correspond to the V phase, and upper arm switching element 43a and lower arm switching element 43b correspond to the W phase. It should be noted that inverter 4 is not limited to such a three-phase inverter, and is also applicable to a two-phase inverter or the like.

A position detection means 1071 is connected to outdoor fan motor 107. Position detection means 1071 outputs, to control unit 6, respective position signals (Hu, Hv, and Hw shown in FIG. 3) of the three phases including the U phase, the V phase, and the W phase, according to a rotational position of a rotor of outdoor fan motor 107.

Control unit 6 includes a computation element such as a microcomputer or a CPU, for example. Control unit 6 converts an input analog electric signal into a digital value. Control unit 6 performs computation and control according to a control application for outdoor fan motor 107. Upon receiving the position signals from position detection means 1071, control unit 6 performs control computation for outdoor fan motor 107. Then, control unit 6 outputs the drive signal to inverter 4. Bus voltage detection unit 7 detects bus voltage Vdc to be input into inverter 4. Bus voltage detection unit 7 outputs a value of detected bus voltage Vdc to control unit 6.

Figure 3:
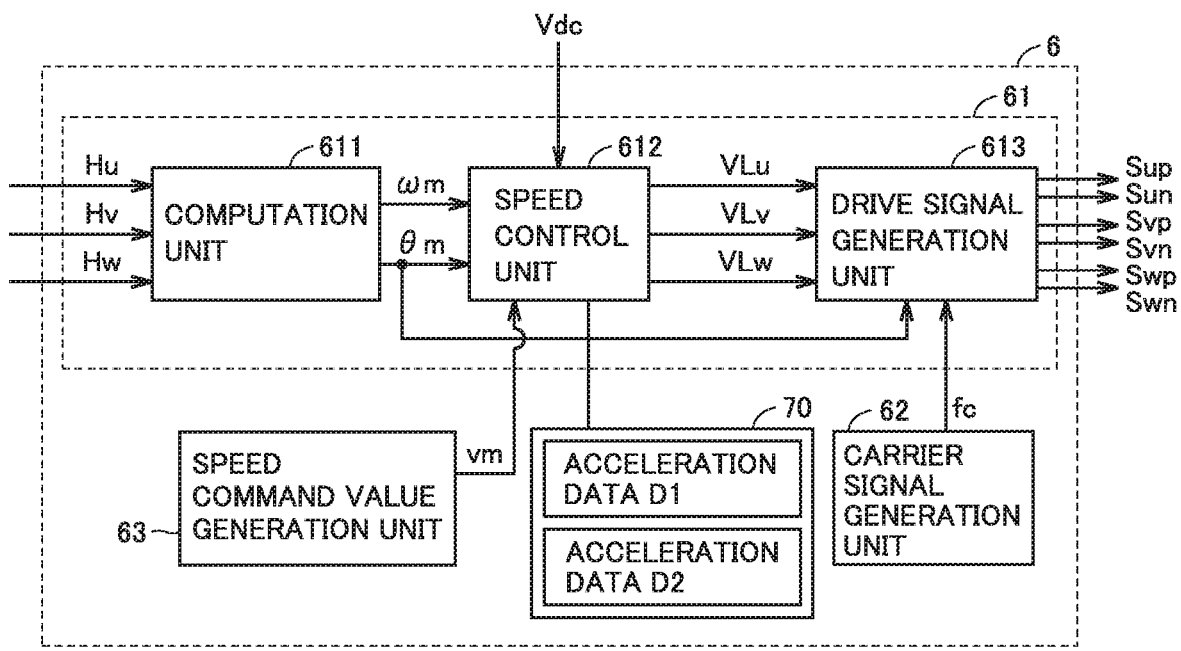
FIG. 3 is a view for illustrating a configuration of a control unit.

FIG. 3 is a view showing an exemplary configuration of control unit 6. Control unit 6 includes a control computation unit 61, a carrier signal generation unit 62, a speed command value generation unit 63, and an acceleration data storage unit 70. Speed command value generation unit 63 generates a speed command value vm for outdoor fan motor 107.

Control computation unit 61 includes a computation unit 611, a speed control unit 612, and a drive signal generation unit 613. Computation unit 611 calculates an execution rotational speed ωm of outdoor fan motor 107 and a rotor rotational position θm, based on position signals Hu, Hv, and Hw. Execution rotational speed ωm and rotor rotational position θm are input into speed control unit 612. Further, speed command value vm generated by speed command value generation unit 63 is also input into speed control unit 612.

Speed control unit 612 calculates inverter output voltage command values VLu, VLv, and VLw based on bus voltage Vdc input from bus voltage detection unit 7. Inverter output voltage command values VLu, VLv, and VLw are input into drive signal generation unit 613.

Carrier signal generation unit 62 calculates the frequency of a power system, based for example on a voltage phase reference output from a voltage phase detection unit (not shown). Based on the calculated frequency of the power system, carrier signal generation unit 62 computes the frequency of a carrier signal used for PWM control, and generates the carrier signal having the computed frequency.

Drive signal generation unit 613 generates drive signals Sup, Sun, Svp, Svn, Swp, and Swn for the inverter, based on the carrier signal and inverter output voltage command values VLu, VLv, and VLw. Drive signal generation unit 613 outputs drive signals Sup, Sun, Svp, Svn, Swp, and Swn to inverter 4. Drive signal Sup is input into upper arm switching element 41a for the U phase. Drive signal Sun is input into lower arm switching element 41b for the U phase. Drive signal Svp is input into upper arm switching element 42a for the V phase. Drive signal Svn is input into lower arm switching element 42b for the V phase. Drive signal Swp is input into upper arm switching element 43a for the W phase. Drive signal Swn is input into lower arm switching element 43b for the W phase.

Acceleration data storage unit 70 stores acceleration data D1 and acceleration data D2 each indicating an acceleration of rotation of outdoor fan 104. Acceleration data D1 is data for accelerating the rotation of outdoor fan 104 at an acceleration α1. Acceleration data D2 is data for accelerating the rotation of outdoor fan 104 at an acceleration α2. In the present embodiment, α2<α1.

When the rotation of outdoor fan 104 is accelerated at acceleration α1, speed control unit 612 calculates inverter output voltage command values VLu, VLv, and VLw based on acceleration α1. "Inverter output voltage command values VLu, VLv, and VLw calculated based on acceleration α1" refer to command values for an output voltage (motor current) which accelerates the rotation of outdoor fan 104 at acceleration α1. When the rotation of outdoor fan 104 is accelerated at acceleration α2, speed control unit 612 calculates inverter output voltage command values VLu, VLv, and VLw based on acceleration α2. "Inverter output voltage command values VLu, VLv, and VLw calculated based on acceleration α2" refer to command values for an output voltage (motor current) which accelerates the rotation of outdoor fan 104 at acceleration α2. With such a configuration, control device 103 can control the acceleration of outdoor fan 104.

In addition, there are various motor types and various motor control methods corresponding to the respective types. Any motor type and motor control method may be used as long as they can control the rotational speed of outdoor fan motor 107. The present embodiment describes a three-phase permanent magnet synchronous motor as an example. As other examples, any of motor types such as a single-phase permanent magnet synchronous motor, an induction motor, and a switched reluctance motor may be adopted.

The present embodiment describes a three-phase full bridge inverter as an exemplary configuration of a control device in control device 103. The control device may include a single-phase inverter, a half bridge inverter, or the like. The present embodiment describes a control method which detects the rotor rotational position of outdoor fan motor 107 as an exemplary control method. However, any method such as position sensorless control may be adopted.

If an overcurrent (see an overcurrent value Ie in FIG. 7) flows into inverter 4 and outdoor fan motor 107, at least one of outdoor fan motor 107 and inverter 4 may be broken. In order to avoid such breakage, interception unit 8 detects the motor current, and when interception unit 8 detects that the value of the detected motor current is an overcurrent value, interception unit 8 outputs the stop signal to control unit 6. Thus, an upper limit value is determined beforehand for the motor current.

Upon receiving the stop signal, control unit 6 performs processing for stopping outdoor fan motor 107. This can avoid outdoor fan motor 107 and inverter 4 from being broken. In the present embodiment, interception unit 8 determines to output the stop signal based on the motor current. However, any method may be adopted as long as outdoor fan motor 107 is stopped based on a current. For example, a method in which interception unit 8 detects a direct current of inverter 4 may be adopted. Further, in the present embodiment, interception unit 8 outputs the stop signal to control unit 6. However, any method may be adopted as long as the outdoor fan motor can be stopped. For example, interception unit 8 may intercept the drive signal output from control unit 6 from being input into inverter 4.

Figure 4:
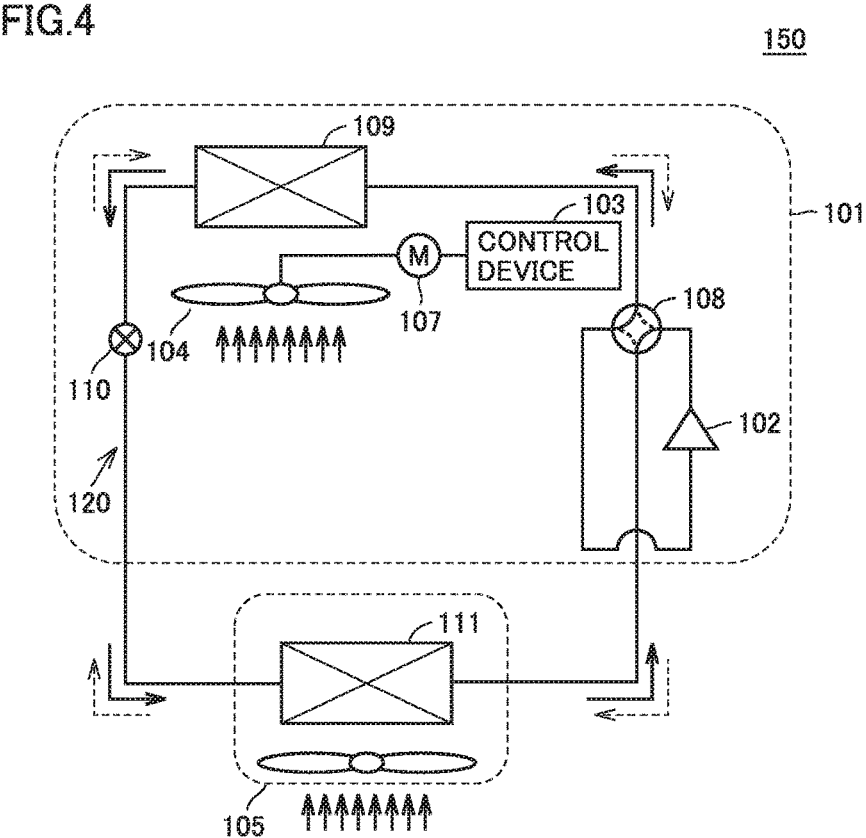
FIG. 4 is a view for illustrating a configuration of a heat pump apparatus.

FIG. 4 is a view for illustrating a heat pump apparatus 150 included in air conditioner 100. Heat pump apparatus 150 includes a refrigerant circuit 120, outdoor fan 104, outdoor fan motor 107, and control device 103. Refrigerant circuit 120 is composed of compressor 102, a flow path switching valve 108, an outdoor heat exchanger 109, a decompression device 110, and an indoor heat exchanger 111 connected by pipes. Air conditioner 100 adjusts room temperature using refrigerant circuit 120.

Next, a cooling operation, a heating operation, and the like will be described using FIG. 4. Air conditioner 100 can execute the heating operation and the cooling operation. The heating operation is an operation of increasing the room temperature, which is an object for temperature increase, to a target temperature. The target temperature is, for example, a temperature which can be set by a user. When air conditioner 100 executes the heating operation, the flow path of flow path switching valve (four-way valve) 108 is set such that refrigerant flows in a direction indicated by broken lines in FIG. 4. High-temperature and high-pressure gas refrigerant discharged from compressor 102 flows into flow path switching valve 108 and a connection pipe, and flows into indoor heat exchanger 111 serving as a condenser.

Indoor heat exchanger 111 condenses the refrigerant by heat exchange with ambient air around indoor unit 105, and warms indoor air. The condensed high-pressure liquid refrigerant flows into outdoor unit 101 via a connection pipe which connects indoor unit 105 and outdoor unit 101. The condensed high-pressure liquid refrigerant is decompressed by decompression device (electronic expansion valve) 110 and thereby turns into low-pressure two-phase refrigerant. Outdoor heat exchanger 109 serving as an evaporator exchanges heat with outdoor air and thereby turns the low-pressure two-phase refrigerant into low-pressure gas refrigerant. Then, the refrigerant flows into compressor 102, and is discharged under pressure again.

On the other hand, when air conditioner 100 executes the cooling operation, the flow path of flow path switching valve 108 is set such that the refrigerant flows in a direction indicated by solid lines in FIG. 4. The high-temperature and high-pressure gas refrigerant discharged from compressor 102 flows from flow path switching valve 108 into outdoor heat exchanger 109 serving as a condenser. The refrigerant which has performed heat exchange with outdoor air at outdoor heat exchanger 109 turns into high-pressure liquid refrigerant, and is decompressed by decompression device 110. The refrigerant, which turns into low-pressure two-phase refrigerant, passes through the connection pipe and flows into indoor unit 105. Then, the refrigerant cools indoor air at indoor heat exchanger 111 serving as an evaporator. Then, the refrigerant evaporated by the heat of the air turns into low-pressure gas. Then, the gas is sucked into compressor 102 via the connection pipe and flow path switching valve 108.

Here, in a case where air conditioner 100 performs the heating operation when outdoor air temperature is low, there arises a frosted state. The frosted state is a state in which frost sticks to outdoor heat exchanger 109. During the heating operation, outdoor heat exchanger 109 exchanges heat with outdoor air and condenses the refrigerant, and thus heat transfers from the outdoor air to the refrigerant. Therefore, outdoor air temperature around outdoor heat exchanger 109 is decreased. Then, when the amount of water vapor contained in the outdoor air exceeds the amount of saturated water vapor at an ambient temperature of outdoor heat exchanger 109, dew condensation occurs. When the condensed dew sticks to fins of outdoor heat exchanger 109 and the like, the condensed dew freezes and becomes frost. The frosted state is a state in which a gap between the fins of outdoor heat exchanger 109 is blocked by the frost and thereby heat resistance occurs between outdoor heat exchanger 109 and the outdoor air. Due to the heat resistance, heat exchange capability between outdoor heat exchanger 109 and the outdoor air is reduced. Thus, heating capacity is reduced with a reduction in the heat exchange capability. Further, air conditioner 100 increases the rotational speed of outdoor fan 104 of outdoor unit 101 to compensate for the reduction in the heat exchange capability. However, when it is impossible to compensate for the reduction in the heat exchange capability even though air conditioner 100 increases the rotational speed of outdoor fan 104, air conditioner 100 executes a defrosting operation.

The defrosting operation is an operation performed by switching the direction of the flow path of flow path switching valve 108 to the same direction as that for the cooling operation. Outdoor heat exchanger 109 is warmed by the defrosting operation. As a result, the frost that has stuck to outdoor heat exchanger 109 is melted. The defrosting operation in the present embodiment includes waiting until the temperature of outdoor heat exchanger 109 becomes lower than the outdoor air temperature, after the frost is melted. That is, the heating operation can be started at the timing when the defrosting operation is finished. In order to prevent outdoor heat exchanger 109 from exchanging heat with the outdoor air during the defrosting operation, control device 103 stops driving of outdoor fan motor 107 such that the rotation of outdoor fan 104 is completely stopped. As a variation, control device 103 may drive outdoor fan motor 107 such that outdoor fan 104 is rotated at a low speed, in order to reduce the degree of heat exchange between outdoor heat exchanger 109 and the outdoor air during the defrosting operation.

Further, since the direction of the flow path of flow path switching valve 108 is switched to the same direction as that for the cooling operation during the defrosting operation, the room temperature is decreased. Accordingly, in order to maintain indoor comfortableness, it is necessary to perform the heating operation immediately after the defrosting operation. For that purpose, it is necessary to cause the rotational speed of outdoor fan motor 107, which has been stopped or driven at a low speed during the defrosting operation, to quickly reach a target rotational speed.

Next, the influence on outdoor fan motor 107 before and after the frosted state will be described. In the frosted state, the gap between the fins of outdoor heat exchanger 109 is blocked by the frost, and thereby loss of an air path is increased. Therefore, when the loss of the air path is increased, a load torque to be applied to outdoor fan motor 107 is increased to maintain the same air quantity as that obtained before the loss of the air path is increased. In addition, as the load torque is increased, the motor current tends to be increased.

Figure 5:
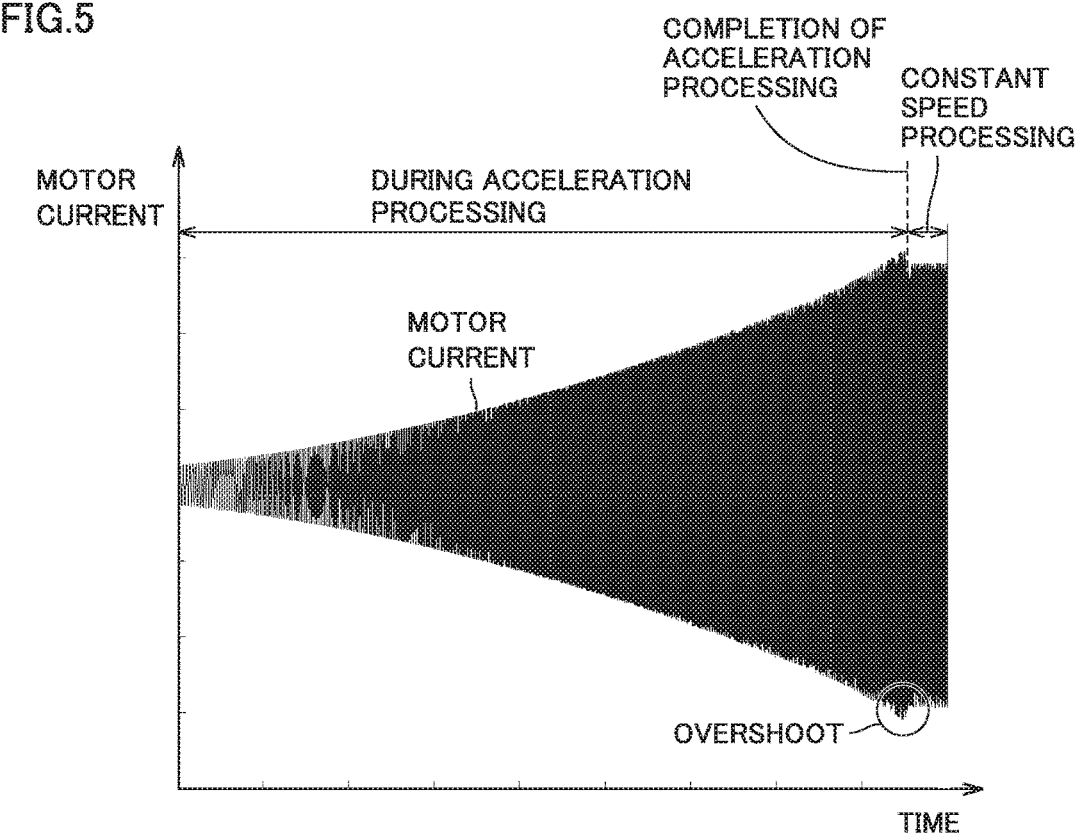
FIG. 5 is a view for illustrating a motor current.

Next, the relation between the acceleration of the rotation of outdoor fan 104 and overshoot of the motor current will be described. FIG. 5 shows an exemplary waveform indicating the relation between the motor current and time. In FIG. 5, the axis of ordinates indicates the motor current actually flowing into outdoor fan motor 107, and the axis of abscissas indicates elapsed time. As the rotational speed of outdoor fan 104 is increased, the load torque to be applied to outdoor fan motor 107 tends to be increased. Thus, as shown in FIG. 5, the motor current is increased with an increase in rotational speed. When the rotational speed of outdoor fan 104 reaches a first rotational speed (rotational speed A) which is a target rotational speed, outdoor fan motor 107 stops acceleration and performs a constant speed operation. When acceleration is stopped, overshoot occurs in the motor current. It should be noted that the overshoot amount of the motor current differs depending on the configuration of control unit 6 and the like. Hereinafter, processing for accelerating the rotation of outdoor fan 104 will also be referred to as "acceleration processing", and processing for maintaining the rotation of outdoor fan 104 at a constant speed after completion of the acceleration processing will also be referred to as "constant speed processing". Here, the "completion of the acceleration processing" means that the rotational speed of outdoor fan 104 reaches the target rotational speed. Further, the heating operation is started at the start of the constant speed processing.

FIG. 6(A) shows a waveform of the motor current obtained during the acceleration processing, on completion of the acceleration processing, and during the constant speed processing in a case where the acceleration is set to α, and FIG. 6(B) shows a waveform thereof in a case where the acceleration is set to 3×α. In FIG. 6(A) and FIG. 6(B), the axis of ordinates indicates the motor current actually flowing into outdoor fan motor 107, and the axis of abscissas indicates elapsed time. As shown in FIG. 6(A) and FIG. 6(B), the overshoot amount of the motor current is increased by increasing the acceleration FIG. 6 also shows that the overshoot amount is increased with an increase in the motor current per unit time.

Figure 7:
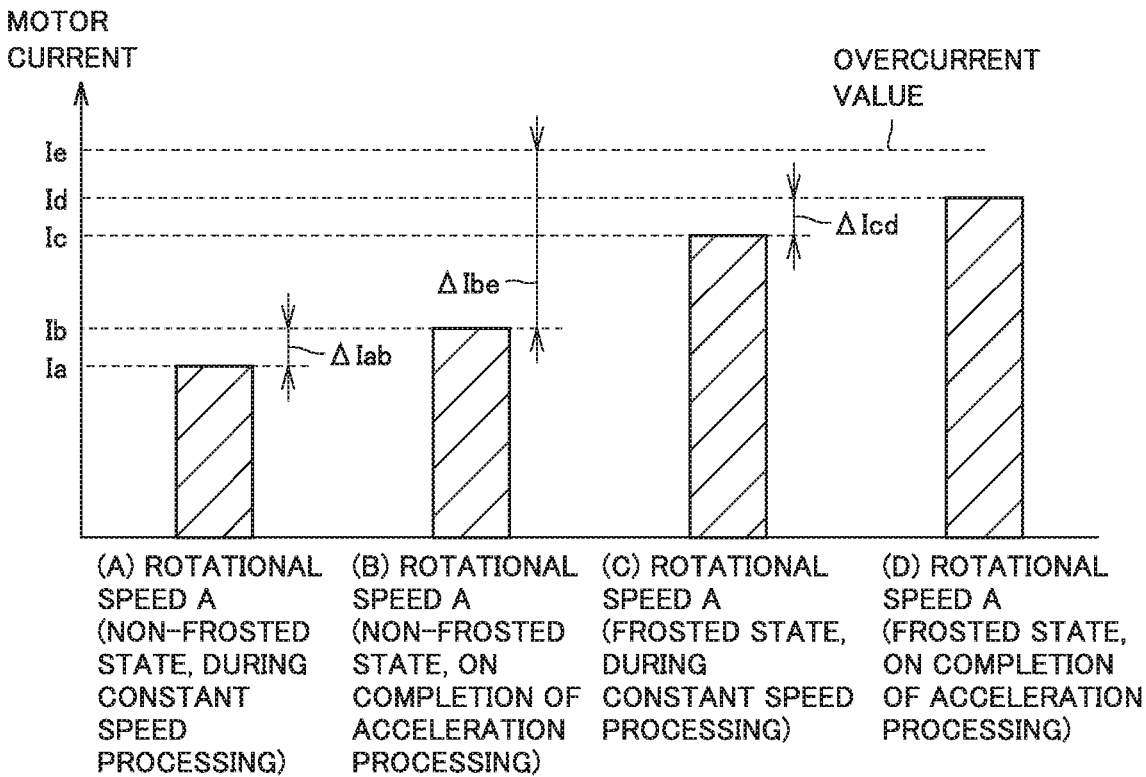
FIG. 7 is a view for illustrating that the motor current differs depending on the state.

FIG. 7 is a view showing the relationship of the motor current supplied when outdoor fan 104 is rotated at the first rotational speed (rotational speed A) (the rotational speed/second of outdoor fan 104) which is the target rotational speed. In FIG. 7, the axis of ordinates indicates the absolute value of the motor current, and the axis of abscissas indicates elapsed time. A "non-frosted state" in FIG. 7 is a state which is not the frosted state. That is, the non-frosted state is a state in which no frost sticks to outdoor heat exchanger 109, or a state in which frost hardly sticks to outdoor heat exchanger 109. In the present embodiment, the non-frosted state refers to a state on completion of outdoor unit 101 (state at factory shipment). When the defrosting operation is finished, a state in which no frost sticks to outdoor heat exchanger 109 is obtained. Therefore, the state when the defrosting operation is finished is also referred to as the "non-frosted state". That is, in the present embodiment, the state after the defrosting operation is finished is close to the state on completion of outdoor unit 101.

Further, the "frosted state" may be a "state which imitates the frosted state", rather than an actual frosted state. For example, the "frosted state" may be a state in which a barrier is provided to block outdoor heat exchanger 109.

The "constant speed processing" means rotating outdoor fan 104 at rotational speed A and at a constant speed. "On completion of the acceleration processing" means the timing when the acceleration processing is completed (finished). The "constant speed processing" and the "completion of the acceleration processing" are also shown in FIGS. 5 and 6.

As shown in FIG. 7(A), in the non-frosted state and when the constant speed processing is executed, a motor current Ia is obtained. As shown in FIG. 7(B), in the non-frosted state and on completion of the acceleration processing, a motor current Ib (Ia<Ib) is obtained. As shown in FIG. 7(C), in the frosted state and when the constant speed processing is executed, a motor current Ic (Ib<Ic) is obtained. As shown in FIG. 7(D), in the frosted state and on completion of the acceleration processing, a motor current Id (Ic<Id) is obtained.

ΔIab which is the value of Ib−Ia is an overshoot amount. ΔIcd which is the value of Id−Ic is an overshoot amount. Further, current values Ia, Ib, Ic, and Id should each be less than Ie, because, if any one of current values Ia, Ib, Ic, and Id is more than or equal to Ie, a current larger than an overcurrent is supplied to outdoor fan motor 107, and outdoor fan motor 107 and inverter 4 may be broken.

As the heating operation executed by air conditioner 100, a first heating operation and a second heating operation can be executed. The first heating operation is a heating operation executed after the defrosting operation. The second heating operation is a heating operation executed before the defrosting operation, and executed without executing the defrosting operation beforehand. Acceleration processing for accelerating the rotation of outdoor fan 104 to start the first heating operation will be referred to as "first acceleration processing". Acceleration processing for accelerating the rotation of outdoor fan 104 to start the second heating operation will be referred to as "second acceleration processing".

Figure 8:
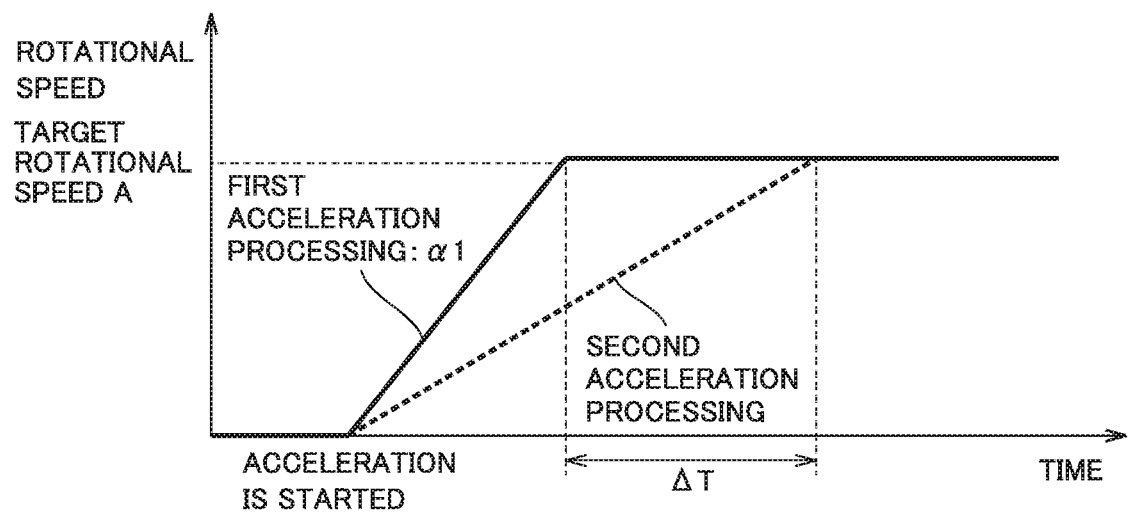
FIG. 8 is a view for illustrating the relation between a first heating operation and a second heating operation.

FIG. 8 shows accelerations of the first acceleration processing and the second acceleration processing. In FIG. 8, the axis of ordinates indicates the rotational speed of outdoor fan 104, and the axis of abscissas indicates elapsed time. As shown in FIG. 8, air conditioner 100 adopts different accelerations α for the first acceleration processing and the second acceleration processing. For example, the acceleration of the first acceleration processing is α1, and the acceleration of the second acceleration processing is α2 (α1>α2). That is, control unit 6 controls outdoor fan motor 107 such that acceleration α is greater in the first acceleration processing than in the second acceleration processing. Thereby, as shown in FIG. 8, a time from the timing when the first acceleration processing is started to the timing when the rotational speed of outdoor fan 104 reaches rotational speed A (the first rotational speed) which is the target rotational speed can be shorter than a time from the timing when the second acceleration processing is started to the timing when the rotational speed of outdoor fan 104 reaches rotational speed A (the first rotational speed) which is the target rotational speed, by ΔT. Therefore, the first heating processing can accelerate the timing of start-up of heating, when compared with the second heating processing.

Next, the relation among the rotational speed of outdoor fan 104, the motor current, and elapsed time will be described using FIG. 9. FIG. 9(A) is a view for illustrating the relationship between the rotational speed of outdoor fan 104 and the elapsed time, and FIG. 9(B) is a view for illustrating the relationship between the motor current and the elapsed time. In FIG. 9(A), the axis of ordinates indicates the rotational speed of outdoor fan 104, and the axis of abscissas indicates the elapsed time. In FIG. 9(B), the axis of ordinates indicates the absolute value of the motor current, and the axis of abscissas indicates the elapsed time.

In FIG. 9(A), timings T3 to T4 indicate a period from when the defrosting operation is finished and outdoor fan 104 starts rotating to when the rotational speed of outdoor fan 104 reaches rotational speed A (the first rotational speed) (a first period), and timings T0 to T1 indicate a period from when a non-defrosting operation (an operation different from the defrosting operation) is finished and outdoor fan 104 starts rotating to when the rotational speed of outdoor fan 104 reaches rotational speed A (the first rotational speed) (a second period). That is, the acceleration in the first period is $\alpha 1$, and the acceleration in the second period is $\alpha 2$. It should be noted that the non-defrosting operation also includes a state in which air conditioner 100 is not powered on.

It is assumed that, from timings T0 to T2, there arises a state in which a certain amount of frost sticks to outdoor heat exchanger 109. Therefore, it can be assumed that the state at T0 to T2 is close to the frosted state. It is also assumed that, from timing T3 when the defrosting operation is finished and thereafter, there arises a state in which the frost that has stuck to outdoor heat exchanger 109 is removed, and thus the state at timing T3 and thereafter is the non-frosted state.

It is assumed that a start manipulation for starting the heating operation is executed by the user at timing T0. At timing T0, control unit 6 executes the second acceleration processing at acceleration $\alpha 2$. At timing T1 when the second acceleration processing is completed, motor current Id is obtained (see FIG. 7(D)). Motor current Id is a current value including an overshoot amount $\Delta I2$.

During the constant speed processing after timing T1, motor current Ic is obtained. It is assumed that the defrosting operation is then started at timing T2. Air conditioner 100 may execute any processing as determination processing for determining whether to start the defrosting operation. For example, since the motor current value is gradually increased by increased frost, air conditioner 100 may determine to start the defrosting operation when the motor current value reaches a threshold value, as an example of the determination processing.

As shown in FIG. 9(A), at timing T2, the constant speed processing is finished to start the defrosting operation. From timing T3 when the defrosting operation is finished, the first acceleration processing is automatically executed. It should be noted that, at timing T3, there arises a state in which the frost that has stuck to outdoor heat exchanger 109 is removed, and the temperature of outdoor heat exchanger 109 becomes lower than the outdoor air temperature. It is assumed that, at timing T4, the rotational speed of outdoor fan 104 reaches rotational speed A which is the target rotational speed by the first acceleration processing. At timing T4 when the first acceleration processing is completed, motor current Ib is obtained (see FIG. 7(B)). Motor current Ib is a current value including an overshoot amount $\Delta I1$. From timing T4 and thereafter, the constant speed processing is executed again. During the constant speed processing, motor current Ia is obtained.

Here, as shown in FIG. 9(A), acceleration $\alpha 1$ in the first acceleration processing started at timing T3 is greater than acceleration $\alpha 2$. As illustrated in FIG. 6, the overshoot amount is increased with an increase in acceleration. Therefore, the overshoot amount is greater in the first acceleration processing than in the second acceleration processing. However, since the non-frosted state arises when the first acceleration processing is started, the motor current is smaller than that in the frosted state (see FIG. 7). Therefore, even when the overshoot amount is increased by using acceleration $\alpha 2$ greater than acceleration $\alpha 1$ in the first acceleration processing, the motor current at timing T4 can be prevented from exceeding overcurrent value Ie.

In a case where one acceleration is used, specification downgrading occurs depending on operation conditions, irrespective of whether or not the defrosting operation has been executed. Here, the specification downgrading means, for example, that the time for accelerating rotation of outdoor fan motor 107 becomes long. Thereby, the timing of start-up of air conditioner 100 may be delayed. As a result, the timing of increasing the room temperature may be delayed.

In contrast, air conditioner 100 in the present embodiment uses different accelerations $\alpha$, depending on whether or not the defrosting operation has been executed. In the present embodiment, the first acceleration processing using acceleration $\alpha 1$, and the second acceleration processing using acceleration $\alpha 2$ can be executed. In the first acceleration processing, a time taken until the rotational speed of outdoor fan 104 reaches the target rotational speed can be shortened, when compared with the second acceleration processing. Therefore, the room temperature can be increased to the target temperature in a short time after the defrosting operation is finished. In other words, it is possible to shorten a time taken until the heating operation is started, in a state in which the room temperature is decreased by executing the defrosting operation. Thereby, the room temperature can be quickly increased, and thus indoor comfortableness can be secured.

Next, acceleration $\alpha 1$ will be described. As also illustrated in FIGS. 7, 9, and the like, control unit 6 drives outdoor fan motor 107 such that the motor current value supplied to outdoor fan motor 107 in the first acceleration processing does not exceed overcurrent value Ie. Here, "the motor current value does not exceed overcurrent value Ie" means that the motor current value including the overshoot does not exceed overcurrent value Ie. In other words, it means that the motor current value obtained at the timing when the first acceleration processing is finished, that is, at the timing when the rotational speed of outdoor fan 104 reaches the target rotational speed by the first acceleration processing, does not exceed overcurrent value Ie.

Further, in such a case where the motor current value exceeds overcurrent value Ie in the first period, the rotational speed of outdoor fan 104 may exceed a predetermined upper limit value (for example, a second rotational speed). In this case, control unit 6 may stop the rotation of outdoor fan 104. This can prevent a failure of outdoor fan 104 and the like. In addition, also in the second acceleration processing, control unit 6 drives outdoor fan motor 107 such that the motor current value does not exceed overcurrent value Ie. This can prevent outdoor fan motor 107, inverter 4, and the like from being broken. Therefore, control unit 6 can safely drive outdoor fan motor 107. Further, in a case where the rotational speed of outdoor fan 104 exceeds the predetermined upper limit value (for example, the second rotational speed) in the second period, control unit 6 may stop the rotation of outdoor fan 104.

Next, a range of acceleration $\alpha 1$ in which control unit 6 can safely drive outdoor fan motor 107 will be described. As illustrated in FIG. 8, $\alpha 2 < \alpha 1$. In addition, Ib (the motor current in the first period), Id (the motor current in the second period), and Ie illustrated in FIG. 7 satisfy the relation Ib<Id<Ie. Based on this relation and $\alpha 2 < \alpha 1$, the range of $\alpha 1$ can be defined by the following equation.

$$\alpha 2 < \alpha 1 \le \frac{Id}{Ib} \alpha 2 \quad (1)$$

By using such an equation (1), a designer of air conditioner 100 can define acceleration α1 from current values Ib and Id and the value of α2. If the right hand side of equation (1) is put in another way, it can also be said that the product of the acceleration and the value of the motor current on completion of acceleration is greater in the second acceleration processing than in the first acceleration processing. This motor current may be the maximum current value including the overshoot.

The designer of air conditioner 100 can determine acceleration α1 and acceleration α2 beforehand, using equation (1). Therefore, air conditioner 100 does not have to execute processing for estimating the air quantity of outdoor fan 104, the load torque on outdoor fan motor 107, and the like. Accordingly, the room temperature can be increased in a short time after the defrosting operation is finished, without requiring the designer of air conditioner 100 to perform considerable computations and the like.

In addition, the right hand side of equation (1) is merely an example, and "Id/Ib" may be replaced by another value. For example, "Id/Ib" may be replaced by "Ic/Ia". Further, for this value, instead of using the current values in FIG. 7, another value may be used. For example, this value may be determined by the designer of air conditioner 100 through conducting experiments.

Second Embodiment

Figure 10:
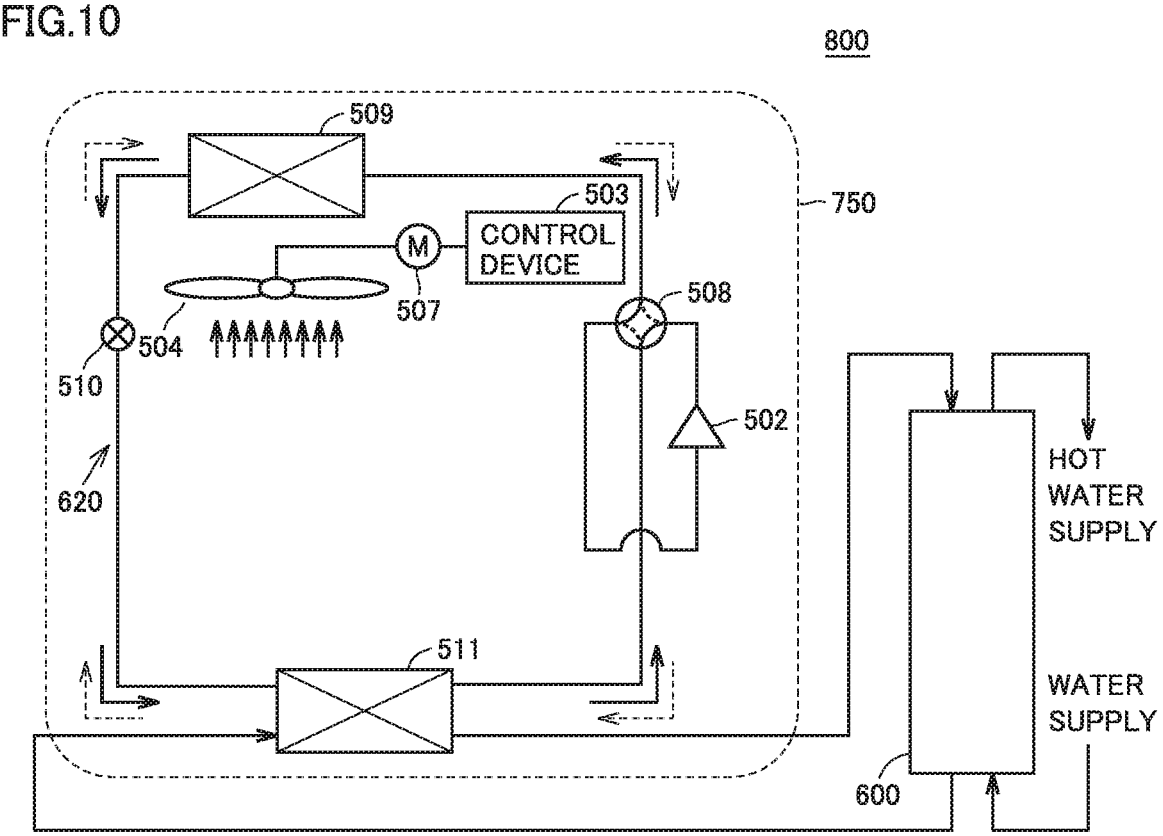
FIG. 10 is a view for illustrating a configuration of a water heater.

In a second embodiment, the heat pump apparatus described in the first embodiment is applied to a water heater. FIG. 10 is a view showing a water heater 800 in the second embodiment. Water heater 800 includes a heat pump apparatus 750 and a hot water storage tank 600. Heat pump apparatus 750 includes a refrigerant circuit 620, an outdoor fan 504, an outdoor fan motor 507, and a control device 503. Refrigerant circuit 620 is composed of a compressor 602, a flow path switching valve 608, an outdoor heat exchanger 609, a decompression device 610, and a water heat exchanger 511 connected by pipes.

Hot water storage tank 600 receives water supply and stores water in a lower portion thereof. The water stored in the lower portion is sucked and supplied to water heat exchanger 511. Water heat exchanger 511 performs a heat-up operation for performing heat exchange between the supplied water and refrigerant, and heats up the water. The heat-up operation is an operation of performing heat-up until the temperature of the water reaches a target temperature. The heated-up water (hot water) is returned to hot water storage tank 600. The returned hot water is stored in an upper portion of hot water storage tank 600. The hot water stored in the upper portion is supplied by a hot water supply manipulation by the user.

Heat pump apparatus 750 in the second embodiment also has the technical idea of heat pump apparatus 150 described in the first embodiment. Heat pump apparatus 750 can execute the defrosting operation. In the present embodiment, the heat-up operation executed by heat pump apparatus 750 includes a first heat-up operation and a second heat-up operation. The first heat-up operation is a heat-up operation executed after the defrosting operation. The second heat-up operation is a heat-up operation executed without executing the defrosting operation beforehand. Further, acceleration processing for accelerating the rotation of outdoor fan 504 in the first heat-up operation will be referred to as "first acceleration processing", and acceleration processing for accelerating the rotation of outdoor fan 504 in the second heat-up operation will be referred to as "second acceleration processing". The acceleration of the first acceleration processing is set to α1, and the acceleration of the second acceleration processing is set to α2 (α1>α2).

Thus, even when heat pump apparatus 150 described in the first embodiment is applied to a water heater, a time taken until the rotational speed of outdoor fan 504 reaches a target rotational speed can be shortened in the first acceleration processing, when compared with the second acceleration processing. Therefore, it is intended to increase the temperature of the supplied water, which is an object for temperature increase, to the target temperature in a short time after the defrosting operation is finished.

[Variation]

The first embodiment has described air conditioner 100 to which heat pump apparatus 150 is applied, and the second embodiment has described water heater 800 to which heat pump apparatus 750 is applied. However, the heat pump apparatus may be applied to other apparatuses as long as the defrosting operation can be executed, and temperature increase processing can be executed by the presence of an object for temperature increase. For example, the heat pump apparatus may be applied to an automatic vending machine which provides hot drinking water and cold drinking water. Such a configuration also exhibits the same effect as those in the first embodiment and the second embodiment.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

100: air conditioner; 101: outdoor unit; 102: compressor; 103: control device; 104: outdoor fan; 105: indoor unit; 107: outdoor fan motor; 108: flow path switching valve; 109: outdoor heat exchanger; 110: decompression device.

The invention claimed is:

1. A heat pump apparatus comprising:
   an outdoor heat exchanger;
   a fan configured to introduce outdoor air into the outdoor heat exchanger; and
   a control device configured to control a defrosting operation of the outdoor heat exchanger,
   the fan rotating at a first rotational speed within a first period, after the defrosting operation is finished and the fan starts rotating,
   the fan rotating at the first rotational speed within a second period, after a non-defrosting operation is finished and the fan starts rotating,
   the first period being shorter than the second period.

2. The heat pump apparatus according to claim 1, wherein the fan stops when a rotational speed of the fan exceeds a predetermined upper limit value in the first period.

3. The heat pump apparatus according to claim 2, comprising a motor configured to drive the fan, wherein
   a current is supplied to the motor in a range in which an equation:

$$\alpha1 \le \frac{I2}{I1}\alpha2$$

is satisfied, where α1 is an acceleration of the fan in the first period, I1 is a current supplied to the motor in the first period, α2 is an acceleration of the fan in the second period, and I2 is a current supplied to the motor in the second period.

4. An air conditioner comprising the heat pump apparatus according to claim 1.

5. A water heater comprising the heat pump apparatus according to claim 1.

6. An air conditioner comprising the heat pump apparatus according to claim 2.

7. An air conditioner comprising the heat pump apparatus according to claim 3.

8. A water heater comprising the heat pump apparatus according to claim 2.

9. A water heater comprising the heat pump apparatus according to claim 3.

* * * * *